(12) United States Patent
Seguin et al.

(10) Patent No.: US 8,050,306 B2
(45) Date of Patent: Nov. 1, 2011

(54) ACOUSTO-OPTICALLY Q-SWITCHED $CO_2$ LASER

(75) Inventors: Vernon A. Seguin, Windsor, CT (US); Peter P. Chenausky, Avon, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 13/020,298

(22) Filed: Feb. 3, 2011

(65) Prior Publication Data

US 2011/0122897 A1 May 26, 2011

Related U.S. Application Data

(63) Continuation of application No. 12/113,315, filed on May 1, 2008, now Pat. No. 7,903,699.

(60) Provisional application No. 60/931,544, filed on May 24, 2007.

(51) Int. Cl.
*H01S 3/22* (2006.01)

(52) U.S. Cl. .................. 372/55; 372/10; 372/13; 372/57

(58) Field of Classification Search .................... 372/55, 372/57, 10

See application file for complete search history.

(56) References Cited

U.S. PATENT DOCUMENTS

| | | | |
|---|---|---|---|
| 3,465,358 A | 9/1969 | Bridges | |
| 3,638,137 A | 1/1972 | Krupke | |
| 4,499,582 A | 2/1985 | Karning et al. | |
| 5,021,631 A | 6/1991 | Ravellat | |
| 5,157,684 A | 10/1992 | Benda et al. | |
| 6,788,722 B1 | 9/2004 | Kennedy et al. | |
| 6,798,816 B2 | 9/2004 | DeMaria et al. | |
| 6,826,204 B2 | 11/2004 | Kennedy et al. | |
| 7,058,093 B2 | 6/2006 | Kennedy et al. | |
| 7,411,989 B2 | 8/2008 | Spinelli et al. | |
| 7,903,699 B2 * | 3/2011 | Seguin et al. | ............. 372/13 |
| 2005/0105581 A1 | 5/2005 | Seguin et al. | |

FOREIGN PATENT DOCUMENTS

| | | |
|---|---|---|
| EP | 0 754 518 A1 | 1/1997 |
| EP | 1317785 A1 | 6/2003 |
| JP | 5-167164 | 7/1993 |
| JP | 7-66483 | 3/1995 |
| WO | 02/05396 A1 | 1/2002 |
| WO | 2008/143772 A1 | 11/2008 |

OTHER PUBLICATIONS

Non Final Office Action received for U.S. Appl. No. 12/113,315, mailed Jul. 28, 2010, 9 pages.
Notice of Allowance received for U.S. Appl. No. 12/113,315, mailed Nov. 18, 2010, 4 pages.
Office Action received for United Kingdom Patent Application No. GB0920130.2, mailed Apr. 28, 2011, 5 pages.
Office Action received for United Kingdom Patent Application No. GB0920130.2, mailed May 10, 2011, 3 pages.
Office Action received for United Kingdom Patent Application No. GB0920130.2, mailed on Aug. 15, 2011, 5 pages.

* cited by examiner

*Primary Examiner* — Dung Nguyen

(74) *Attorney, Agent, or Firm* — Morrison & Foerster LLP

(57) ABSTRACT

A pulsed $CO_2$ laser is Q-switched by an intracavity acousto-optic (AO) Q-switch including an AO material transparent at a fundamental wavelength of the laser. In one example the AO material is germanium.

16 Claims, 12 Drawing Sheets

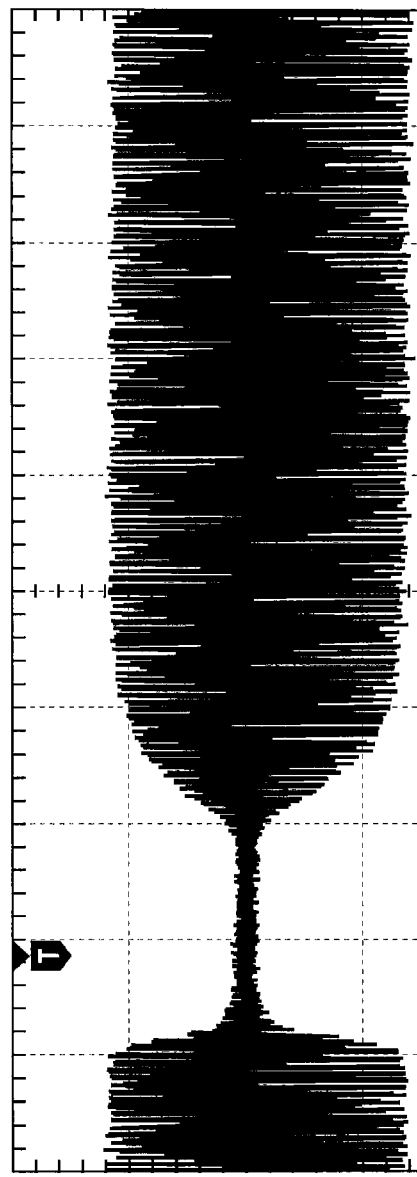
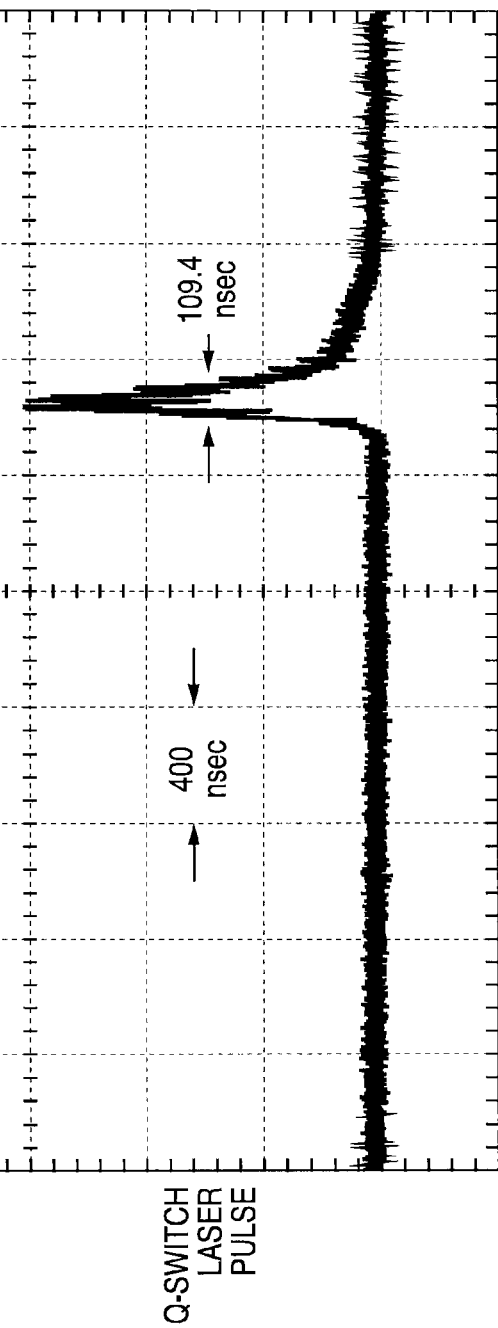
FIG. 4A
FIG. 4B

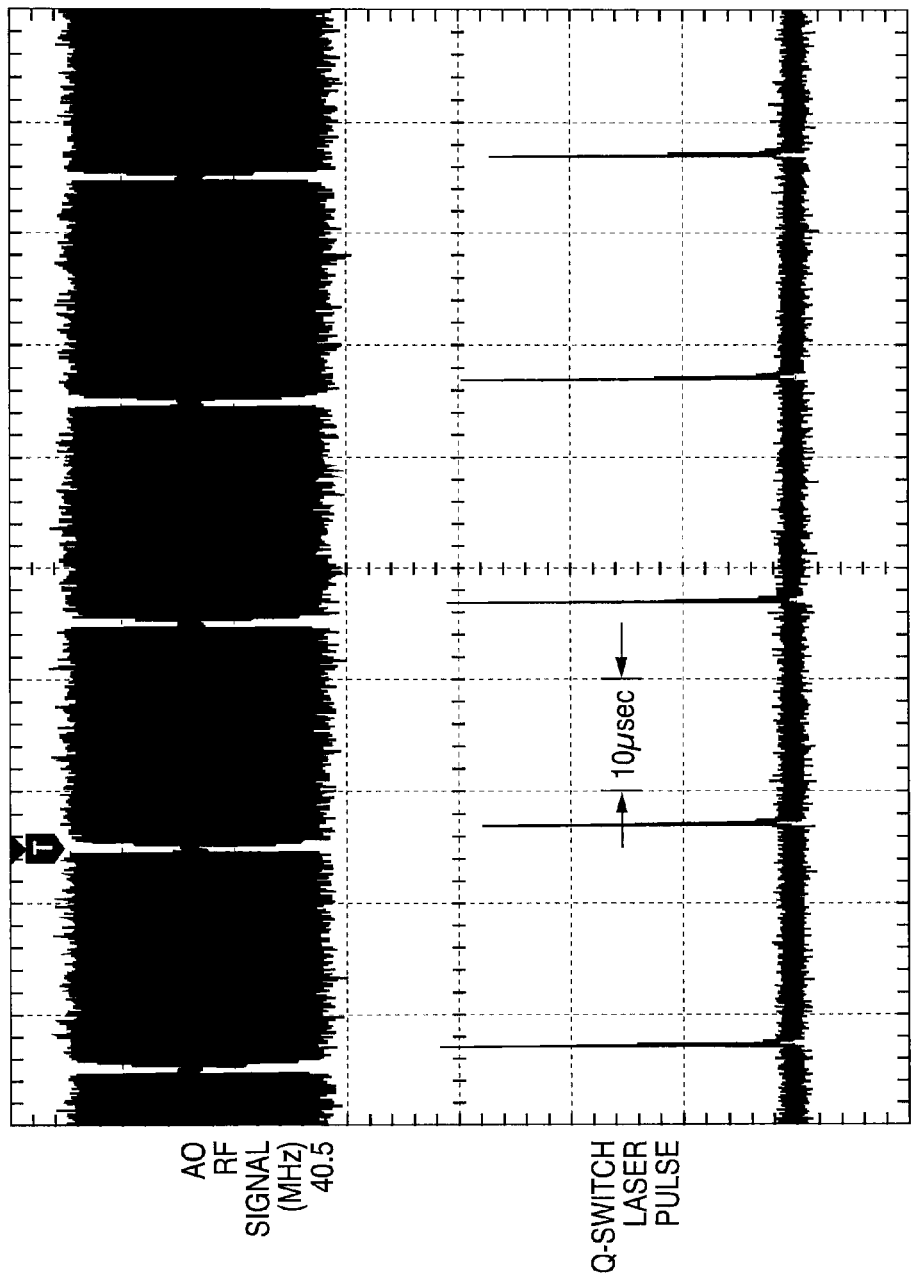

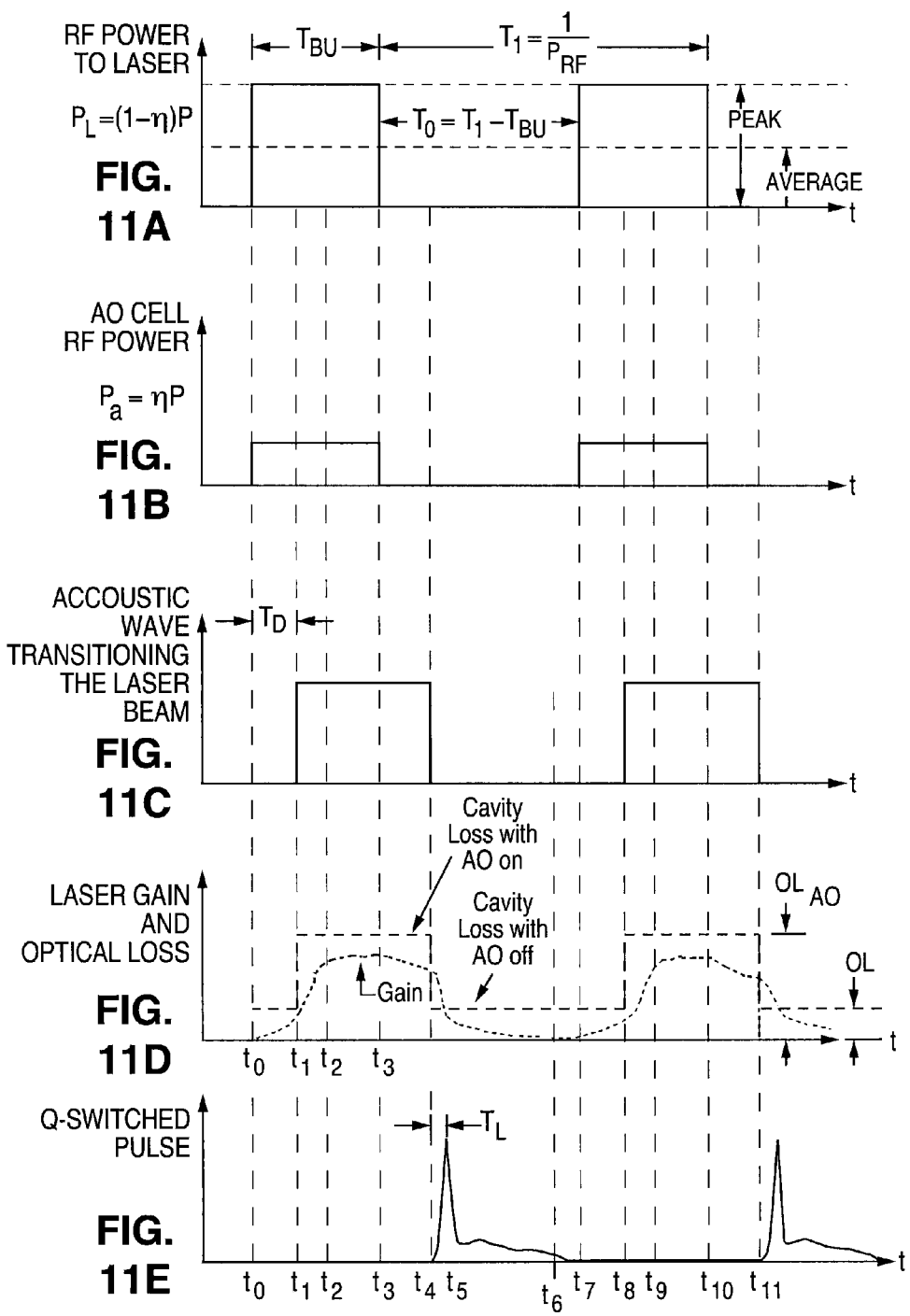

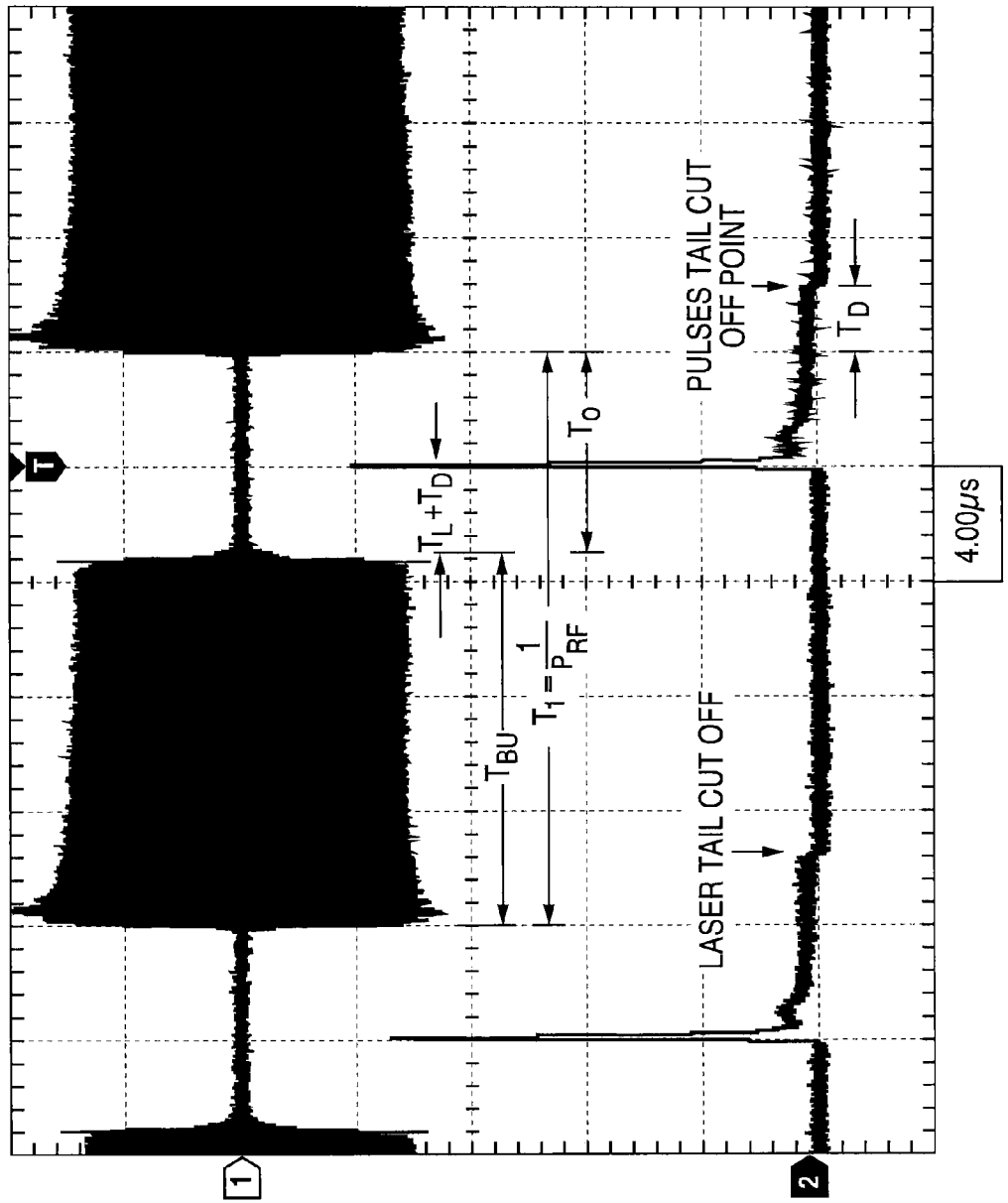

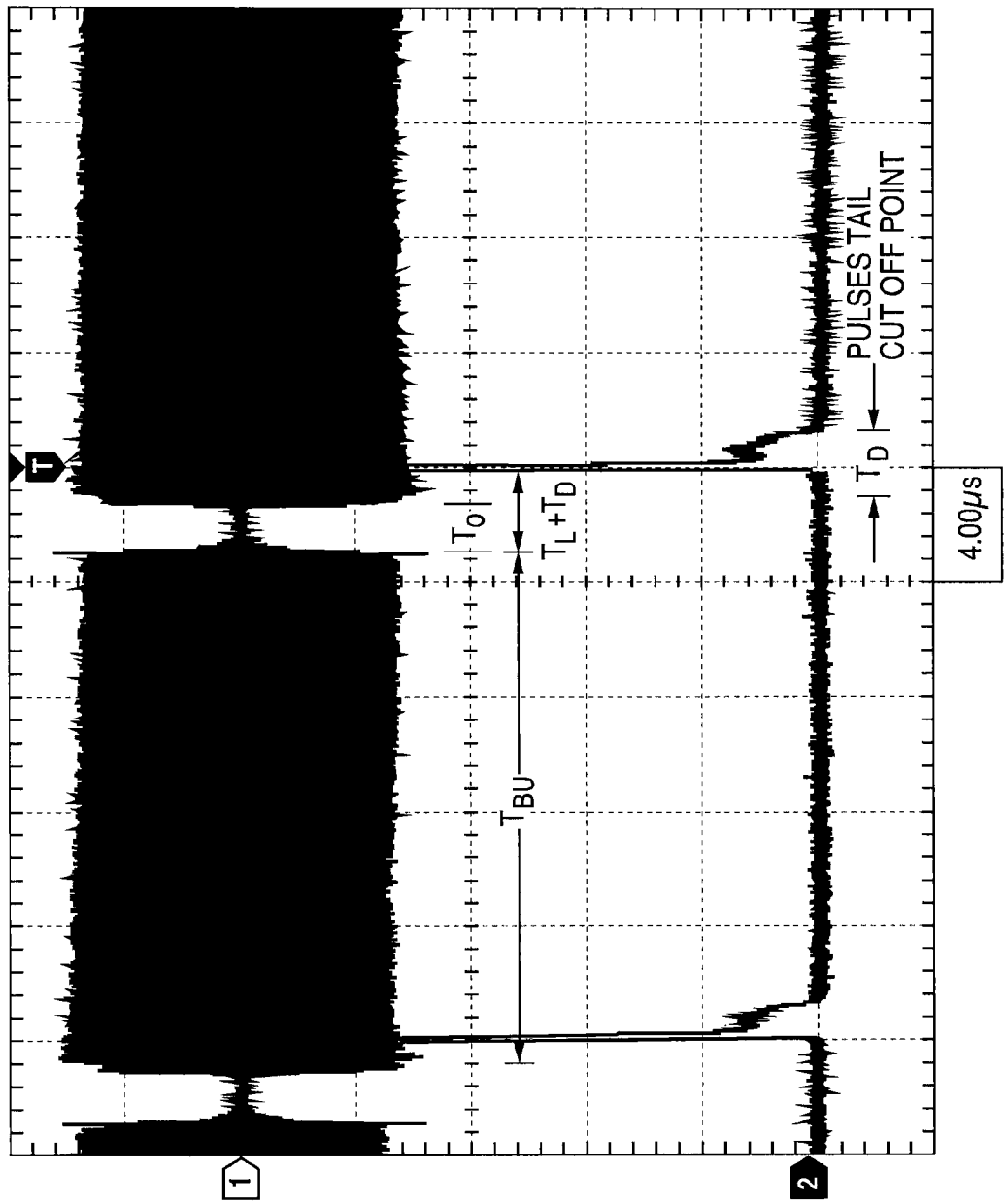

ACOUSTO-OPTICALLY Q-SWITCHED $CO_2$ LASER

PRIORITY

This application is a continuation of U.S. patent application Ser. No. 12/113,315, filed May 1, 2008, which in turn claims priority to U.S. Provisional Application Ser. No. 60/931,544, filed May 24, 2007, the disclosures of which are incorporated herein by reference.

TECHNICAL FIELD OF THE INVENTION

The present invention relates in general to Q-switched pulsed lasers. The invention relates in particular to Q-switched high-power pulsed carbon dioxide ($CO_2$) lasers.

DISCUSSION OF BACKGROUND ART

High power Q-switched pulsed CO2 lasers have been manufactured in folded waveguide and folded free space Gaussian mode designs. Such a Q-switched $CO_2$ lasers have optical characteristics attractive for a number of specialized, high-value applications in materials processing, such as via hole drilling, and printed circuit board (PCB) polymer ablation. A high-power Q-switched $CO_2$ laser is also useful as an oscillator in a master-oscillator power-amplifier (MOPA) arrangement for use in plasma-EUV (extreme ultraviolet) radiation generation for photolithography. Such a laser combines very high peak instantaneous optical power, for example, about 10 kilowatts (kW) or greater, with modest average power, for example, about 10 watts (W) or greater, in a compact package.

One common method of Q-switching a high power $CO_2$ laser involves use of an intra-cavity electro-optic (E-O) modulator. This provides very fast, for example, tens of nanoseconds (ns), optical switching, resulting in a laser with short optical pulses, for example about 100 ns FWHM (full width at half maximum), and high pulse repetition rate, for example about 100 kilohertz (kHz) or greater. To date, the only material with a suitable combination of high electro-optic coefficient, high bulk resistivity, and low infrared absorption is single-crystal cadmium telluride (CdTe). A pulsed $CO_2$ laser including a CdTe E-O Q-switch is described in U.S. Pat. No. 6,826,204 assigned to the assignee of the present invention.

A complete reliance on CdTe for E-O Q-switching CO2 lasers presents two key issues. The first is high component costs which include the cost of the CdTe crystal itself and the cost of a high-speed, high-voltage modulator driver for driving the CdTe crystal. These component costs result in a cost of the finished pulsed $CO_2$ laser many times higher than that of a continuous wave (CW) $CO_2$ laser of comparable average power.

More significant, however, is that there is only a very limited supply of modulator quality CdTe crystals. For many years there has been only one vendor (Keystone Crystals Corporation, of Butler, Pa.) for such CdTe crystals. Other crystal-growers have attempted to grow CdTe crystals of the required quality but those attempts have been generally unsuccessful. This means in effect that there may be a long-term instability of supply for E-O switch quality CdTe crystals. This is troublesome when considering development of a large-scale commercial product. The high cost associated with problems in growing the CdTe crystals presents a significant barrier to further development of E-O Q-switched $CO_2$ lasers and applying such lasers in material processing systems.

An alternate, relatively inexpensive approach to Q-switching a $CO_2$ laser involves scanning a resonator end-mirror or a resonator fold-mirror such that the mirror sweeps reciprocally from one completely misaligned position to another through an optimally aligned position. This approach is described in U.S. patent application Ser. No. 11/638,645, filed Mar. 13, 2006, assigned to the assignee of the present invention and incorporated herein by reference. A problem with this approach is that the mirrors are preferably scanned at a characteristic resonant frequency to provide a suitable combination of scan-angle and sweep-speed. This limits the range of PRF available in such a laser, and accordingly, such a laser cannot be expected to have as flexible operating parameters as an E-O Q-switched CO2 laser. There is a need for a pulsed Q-switched laser that does not require a CdTe E-O Q-switch, but that can be Q-switched at comparable rates and with the same flexibility as a CdTe E-O Q-switched CO2 laser.

SUMMARY OF THE INVENTION

The present invention is directed to a pulsed Q-switched CO2 laser. In one aspect a laser in accordance with the present invention comprises a laser resonator having a gaseous gain-medium therein including $CO_2$. An excitation arrangement is provided for exciting the $CO_2$ including gain-medium. An acousto-optic (AO) Q-switch is located in the laser resonator and includes an AO material transparent at a fundamental wavelength characteristic of $CO_2$.

The AO material is preferably transparent at wavelengths between about 9 micrometers and about 11 micrometers. One preferred wavelength is about 10.6 micrometers. One preferred AO material is germanium.

The laser resonator preferably has output coupling greater than about 50 percent. In one example the laser resonator is terminated by first and second mirrors, and the second mirror is partially transparent to the fundamental wavelength and provides the output coupling. The inventive laser is capable of delivering a train of pulses having a peak power of at least about 10 kW and an average power of at least about 10 W.

In one preferred embodiment, a single RF power supply is utilized to power the electrodes of the laser exciting the laser gas as well as to drive the AO cell.

BRIEF DESCRIPTION OF THE DRAWINGS

FIGS. 4, 5 and 6 are oscilloscope tracings of the input RF power and output light pulses from a carbon dioxide laser of the type illustrated in FIG. 2.

FIG. 11 is a timing diagram illustrating the operation of a carbon dioxide laser of the type illustrated in FIG. 2 but modified in accordance with FIG. 9.

FIGS. 12 and 13 are oscilloscope tracings of the input RF power and output pulses from a carbon dioxide laser of the type illustrated in FIG. 2 but modified in accordance with FIG. 9.

DETAILED DESCRIPTION OF THE INVENTION

Figure 1A:
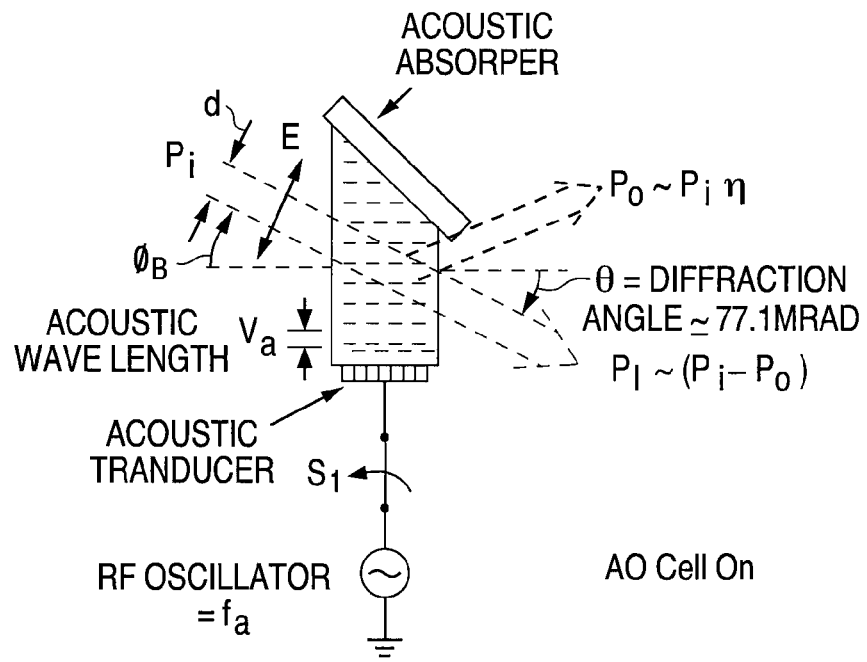
FIG. 1 illustrates a preferred form an acousto-optic (AO) cell suitable for Q-switching a carbon dioxide laser.

The subject invention relates to a carbon dioxide laser that uses an acousto-optic (AO) cell to achieve Q-switching instead of a more conventional electro-optic Q-switch.

AO cells have been used in the prior art for Q-switching other lasers. This is a very common technique used with near-IR solid-state lasers, such as Nd:YAG. At these shorter wavelengths (1-2 μm compared to 10 microns for $CO_2$ lasers), there exist several candidate AO materials with low optical loss, such as quartz and TeO4. However, the only AO material that is useful at present in the 9-11 μm band is single crystal germanium (Ge). Although germanium is a generally good optical material, it none-the-less has relatively high IR absorption, typically about 1-2% per centimeter in the 9 to 11 micron band. The Ge AO crystal through which the laser beam passes is typically 5 cm wide in order to obtain approximately 80% deflection efficiency of the laser beam propagated through the AO cell at reasonable acoustic power levels. The resulting optical loss through such a crystal is therefore about an order of magnitude higher than the loss associated with CdTe. On the other hand, the detrimental optical lensing effects caused by this absorption are offset by the relatively high thermal conductivity of Ge over CdTe. Consequently distortion of a $CO_2$ laser beam that passed through a Ge AO cell is comparable to a $CO_2$ laser beam that passed through a CdTe EO cell. Ge has a relatively high refractive index of 4 so anti-reflection coatings on its surfaces are necessary for intercavity laser operation. Ge has the advantage of superior optical quality uniformity across the crystal when compared with CdTe. It is also available in much larger sizes than CdTe.

Despite the optical losses, germanium has been successfully and commonly used, for over 15 years, in conjunction with $CO_2$ lasers for controlling the direction of the beam outside the laser cavity. It has been most commonly used as an optical beam deflector external to a laser's optical cavity in high speed $CO_2$ laser beam scanning systems for commercial marking and hole drilling applications. (See, U.S. Pat. No. 5,021,631, entitled "System for Marking Moving Objects by Laser Beams" by Raveilat and Del Valles, See also U.S. Pat. Nos. 7,058,093 and 6,826,204, both of which are incorporated herein by reference.) An AO cell has also been used as a frequency shifter external to a laser's optical cavity in $CO_2$ laser radar systems.

To support these $CO_2$ laser applications, a modest yet thriving vendor base has developed to supply high quality Ge AO modulators. Several suppliers, including Intra-Action, Isomet, and Brimrose produce off-the-shelf devices and associated RF drivers in significant quantities. In many of the above-mentioned systems, optical power levels of several hundred watts through-put have propagated through these devices. In addition, AO devices are relatively cost effective when compared with EO devices at $CO_2$ wavelengths. Complete Ge modulators cost less than two thousand dollars. In contrast, a suitable CdTe crystal alone, prior to mounting, costs about six thousand dollars. The cost of the electronics is additional.

Despite the fact that Ge modulators have been in use outside of the laser cavity, it appears that such modulators have not been used in commercial laser systems to provide Q-switching. A significant discouraging factor has been the relatively high optical loss (several percent per cm one-way) in even a good quality Ge device. This would result in reduced laser output efficiency of approximately 25% compared with CdTe Q-Switched $CO_2$ lasers. Nevertheless it was decided to investigate whether there were circumstances under which a Ge modulator could function competitively as a Q-switch for a $CO_2$ laser.

Based on our investigations, we determined that the optical loss situation mentioned above can be greatly mitigated by the use of high gain lasers obtained from either many zig-zag foldings of the laser beam and/or by super-pulsing the laser discharge within either a waveguide or a free space Gaussian mode laser resonator design.

Typically, a high gain $CO_2$ laser has a long gas-discharge gain medium composed of numerous narrow ceramic waveguides having either square, round or elliptical cross sections, arranged in a multiple folded geometry so as to be connected optically in series. The high gain can be also obtained by super pulsing the laser discharge thereby offering the option of reducing the number of folds. The use of optical folding can yield a total laser gain length of several meters long.

In lasers of the type manufactured by the assignee herein, the typical length of each waveguide channel or pass is on the order of 45 centimeters. A typical amount of gain is on the order of 0.5 percent per centimeter. So for a three pass resonator, the gain is well under 1.0 (45×3×0.005=0.675). However, using a five pass resonator, the gain can be driven about 1.0. Where a folded geometry is used, it is therefore preferable to use at least a five pass or higher resonator design.

To obtain optimum energy extraction from such a high gain $CO_2$ laser the use of a relatively high (>50%) output coupling mirror (i.e., low reflectivity) is required. For a seven or nine pass design, output coupling of 75 percent or higher can be used.

Insertion of an AO modulator into such a high gain laser's resonator having such high output coupling will increase the total cavity loss by a much lower percentage then if the AO cell was inserted into a low gain (i.e., short) $CO_2$ laser. Consequently the laser efficiency of an AO Q-switched high gain $CO_2$ laser is not as bad as one would experience with a short laser (i.e., a low gain laser) because the loss contributed by the AO modulator will be substantially less than the laser's output coupling. This results in a smaller fraction contribution by the AO cell optical losses to the overall cavity losses. For a $CO_2$ laser having a 75% output coupling mirror, the 15% to 20% contributed by the AO modulator loss (for example) is sufficiently small so as to be acceptable.

The realization stated in the two above paragraphs coupled with the present capability of designing a high gain $CO_2$ laser achievable with either folded laser cavity designs or with super pulse discharges can result in small, compact Q-switched laser packages acceptable by the marketplace is an important aspect of this invention. This invention is particularly attractive as a cost effective Q-switched laser oscillator of a high pulse repetition frequency (PRF) Q-switched laser amplifier chain for generating extreme UV radiation from laser generated plasmas for EUV photolithography applications in the semiconductor industry in addition to material processing applications.

FIG. 1 schematically illustrates the functioning of a AO modulator with an RF signal applied to the acoustic transducer (i.e., the switch S in FIG. 1 is closed. The input laser beam having a diameter "d" (a round beam is assumed as an example only), an electric field (E) polarized parallel to the base of the AO cell (i.e., the side of the AO cell) and a power "Pi" is propagated through the AO cell at the Bragg angle $\phi_B$ of the acoustic waves of wavelength Va, thereby diffracting a major portion of the laser beam at a diffraction angle $\theta=(\lambda f_a/v_a)$ where $\lambda$ is the IR wave length (i.e., 9 to 11 microns for $CO_2$ lasers, $f_a$ and $v_a$ are the acoustic frequency and velocity (va=$5.5\times10_3$ in/sec in Ge), respectfully. For fa=40 MHz, $\theta$ is typically 77.1 mrad. For $\lambda$=10.6 microns, the Bragg angle $\phi_B$ is approximately 38.5 mrad for an acoustic frequency of 40 MHz in Ge. The intensity of the acoustic wave (Pac) determines the amount of diffracted laser power ($P_o\sim P_i\eta$) where $\eta$ is the percentage of the $P_i$ laser power that is diffracted at angle $\theta$. Typically $\eta$ is approximately 80% at 10.6 microns with an acoustic frequency of 40 MHz and a power of approximately 30 watts in Ge.

The un-diffracted power of the through-put beam is $P_1\sim(P_i-P_o)$. The percentage of the diffracted beam "$\eta$" can be calculated from:

$$\eta=\mathrm{Sin}^2[(1.57(2/\lambda^2(L/H)MP_{ac})^{1/2}] \quad \text{Eq. 1}$$

Where:
L/H are geometric factors,
Pac is the acoustic power,
M is the figure of merit for the Ge material=$180^{15}$ m$^2$/Watt.

If the cell of FIG. 1A was to be inserted into the feedback optical cavity of a laser, it would provide the high loss condition of the Q-Switched $CO_2$ laser.

For proper operation, the AO cell is oriented with the deflection plane parallel to the waveguide polarization axis. The cell is rotationally adjusted so that the intra-cavity beam enters the Ge crystal at the Bragg angle. Between pulses, lasing is suppressed by applying RF power to the AO cell, resulting in a beam deflection of twice the Bragg angle. To generate an optical pulse, RF power to the AO cell is switched off briefly, with the length of the pulse tail being determined by the RF off time.

Figure 1B:
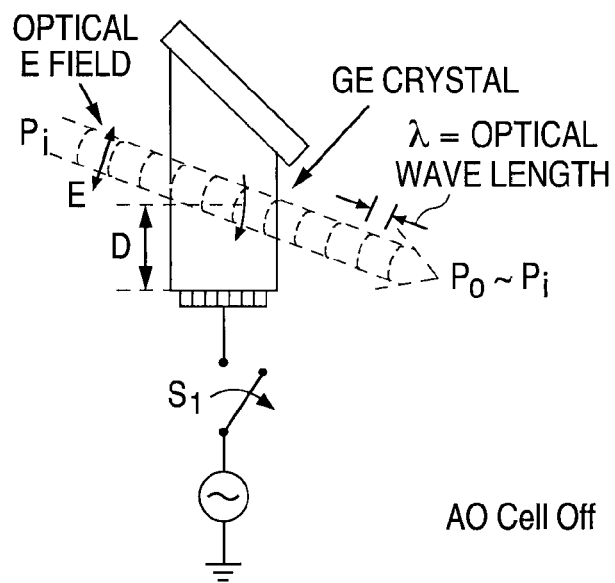

FIG. 1B schematically illustrates the functioning of the AO modulator with no RF power applied to the acoustic transducer (i.e., the switch S is opened). In this case there is no diffraction and to first order Po$\sim$Pi neglecting optical absorption (i.e., can be 1 to 2% per cm at 9 to 11 microns) and the reflection from the anti-reflection coated surfaces. In the examples discussed below, when there is no power to the AO cell as shown in FIG. 1B, the laser will be in a low loss state.

Experimental Laser Configuration:

To investigate the viability of the AO Q-switched approach, a demonstration laser was assembled using existing components. The assembly is shown in FIG. 2. The laser gain cell consists of a sealed, RF-excited waveguide laser tube, with a total of nine waveguide U-shaped waveguide slots (3.2 mm×3.2 mm cross section), arranged in a multiple fold geometry. The slots are typically defined by channels machined into a ceramic block. Each of two large mirrors $M_1$ and $M_2$ at each end of the laser housing provided three folded reflections. The output coupler $M_0$ had a 25% reflectivity (or 75% coupling), and a ZnSe thin-film polarizer (TFP) 20 provided both resonator polarization and a vacuum window. Several of the mirrors were custom-coated to ensure lasing at the desired 9.25 μm wavelength.

For simplicity only a 5 pass folded resonator configuration is shown in FIG. 2. $M_0$ is the outcoupling mirror. Mirrors $M_1$ and $M_2$ are two rectangular beam folding mirrors and mirror $M_3$ is located external to the hermetically sealed laser housing and is the high reflectivity mirror of the laser cavity. Additional information about folded waveguide lasers is disclosed in the following commonly owned patents, each of which is incorporated by reference: U.S. Pat. Nos. 6,788,722 and 6,798,816.

The gain cell was mounted on a stable base structure. A standard 5.0 cm wide Ge acousto-optic beam deflector (Intra-Action #ADM-406B1) was then aligned next to the polarizer 20 at the end of the tube, and rotationally oriented to be at the Bragg angle, which is approximately 38 mrad at the 40 MHz acoustic center frequency and at an IR wavelength of 9.25 microns. A plano end reflector (M3) was positioned behind the AO cell to complete the resonator. The AO cell is inserted outside the hermetically sealed laser tube housing containing the $CO_2$ gas mixture between the end mirror $M_3$ and the thin film polarizer 20.

A standard 100 MHz power supply 22 was used to provide approximately 1 kW of RF power to the electrodes 24 of the $CO_2$ discharge through switch $S_2$. In addition, a standard 40 MHz supply 30 was used to drive the AO cell with approximately 30 W max power. This latter unit was gated by an external pulse generator to provide the desired optical pulse repetition frequency (PRF).

Figure 2A:
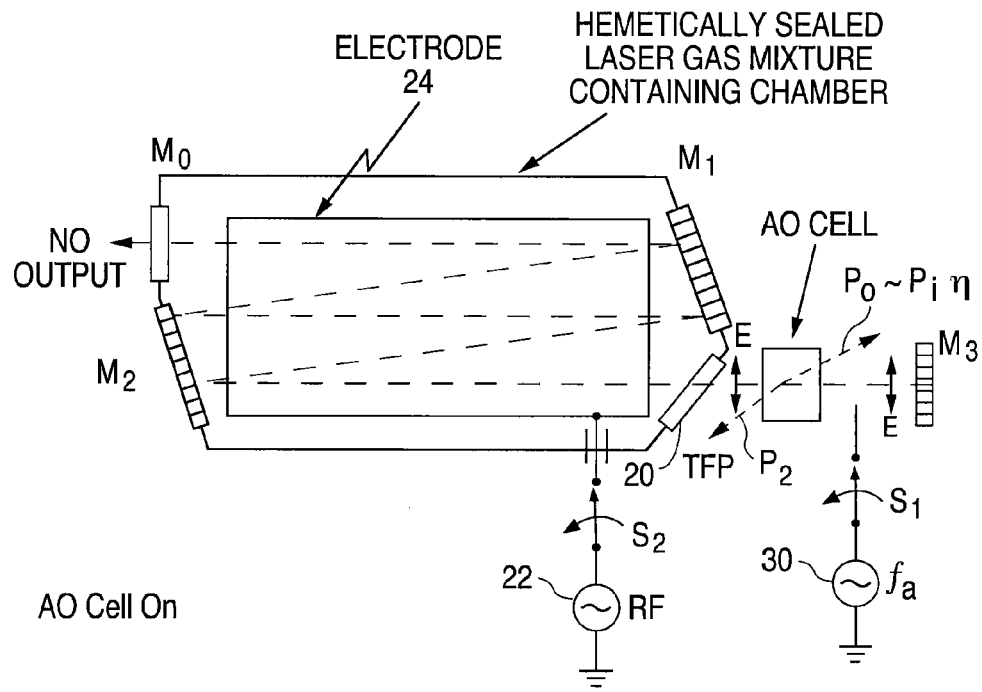
FIG. 2 illustrates a carbon dioxide laser system Q-switched with an AO cell.
Figure 2B:
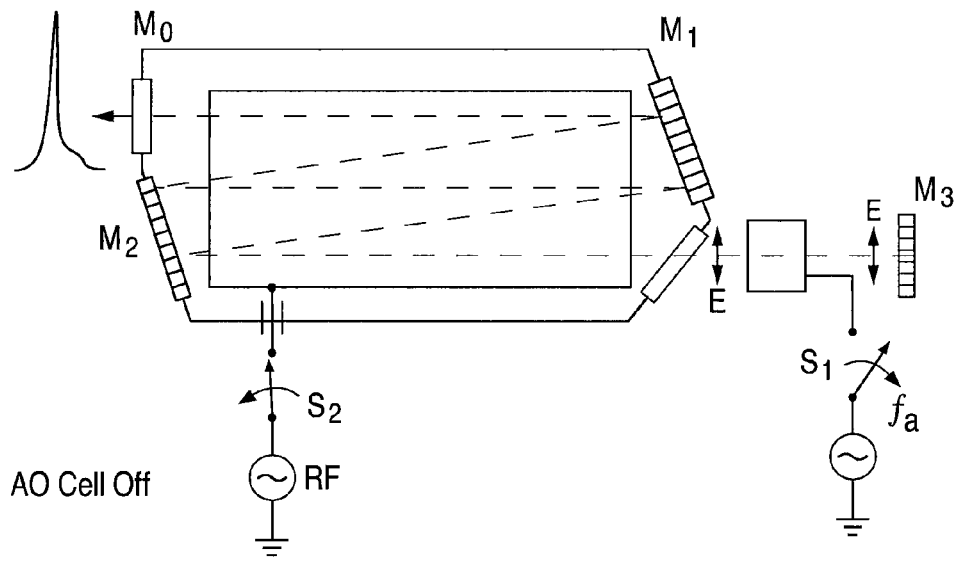

With the switch "S1" closed as in FIG. 2A, laser radiation is diffracted out of the cavity. This is the high loss state and the laser is not able to oscillate. When the switch "S1" is opened (FIG. 2B), there is no acoustic waves in the cell. No radiation is therefore diffracted out of the laser cavity. This is a low loss state and the laser can oscillate.

In this experiment, switch S2 remained closed at all times so RF power from supply 22 was continuously supplied to the laser discharge. It would be possible to superpulse the laser by opening and closing switch S2. Using a reduced duty cycle permits the laser to be operated with higher RF powers to generate higher power peak pulses. (Additional information regarding superpulse type operation can be found in commonly owned U.S. Pat. No. 6,826,204, incorporated herein by reference.) Synchronizing the opening and closing of switches S1 and S2 of FIG. 2 offers flexibility in the pulse formats that can be delivered by the laser.

The turning on/turning-off time sequencing of the RF power driving the laser discharge generating the $CO_2$ laser gain, the acoustic power Pac, the acoustic time delay along with the resulting Q-switched pulse timing as well as the associated pulse tail clipping are shown in FIG. 3. FIG. 3A shows the RF power to the laser. FIG. 3B illustrates the power to the AO cell. FIG. 3C is intended to show the effect of the AO cell at the beam location within the cell. More specifically, and as discussed below, there is a delay between the time the power is applied to the transducer in the cell and the time the acoustic wave reaches the laser beam. Conversely, there is a similar time delay between the time the power is removed from the transducer and the time the break in the acoustic wave reaches the laser beam. Thus, the laser will not go into a low loss state immediately after the power to the transducer is removed, but at a later time. FIG. 3D shows the laser output.

Figure 3A:
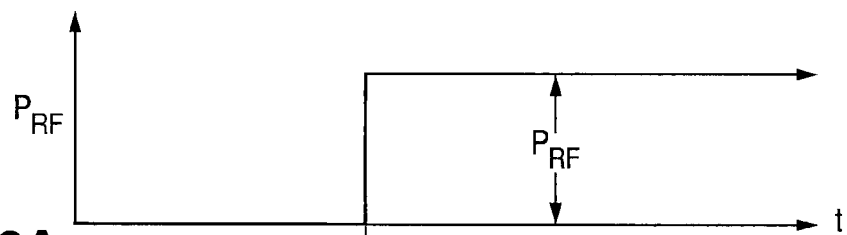
FIG. 3 is a timing diagram illustrating the operation of a carbon dioxide laser of the type illustrated in FIG. 2.
Figure 3B:
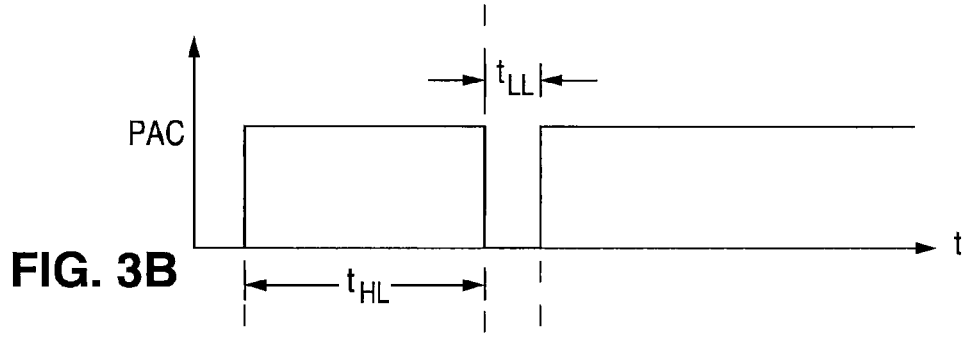
Figure 3C:
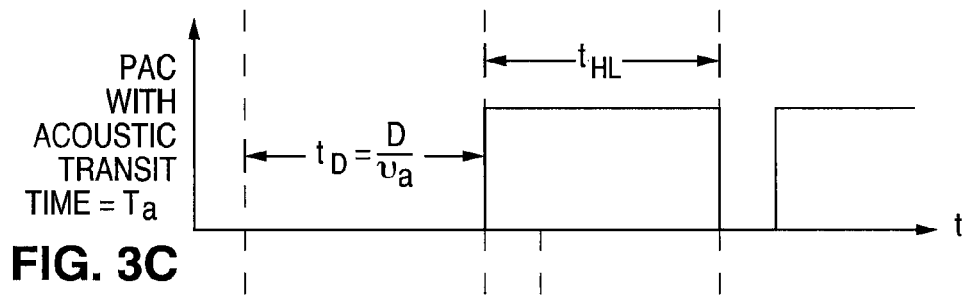
Figure 3D:
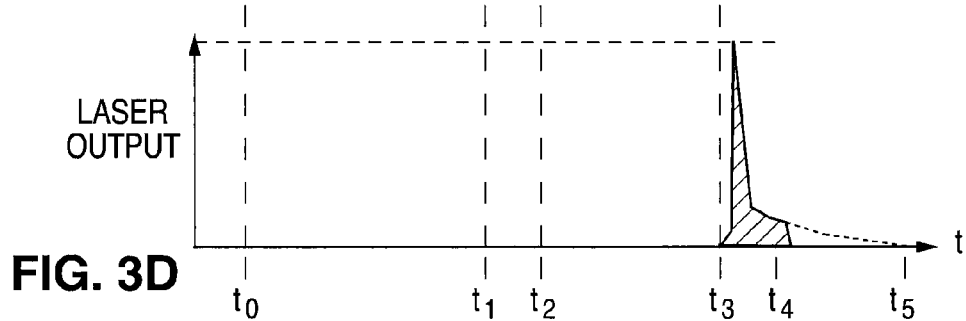

In FIG. 3A at time $t_1$, the RF power to the laser's RF power supply is turned on. Only as an example, we assume the RF power to the laser discharge stays on continuously. At an earlier time "$t_o$," (see FIG. 3B) the power to the AO cell was already turned on and stayed on for a time $t_{HL}$. At time $t_1$ it was turned off as the RF power to the discharge was turned on. The AO cell is turned back on at time $t_2$ after waiting for a time "$t_{LL}$" (see FIG. 3.0B). Since the acoustic wave interacts with the laser radiation at a distance "D" from the transducer (see FIG. 1.0B), there is a time delay $t_D=D/V_a$ due to the time it takes for the acoustic wave to reach the point where it interacts with the laser radiation. (see FIG. 3C). When the acoustic wave intersects the laser beam's location, it causes a high loss to occur due to the diffraction of radiation out of the cavity as in FIG. 1A. The population of the upper laser level builds up during the "$t_{HL}$," period (between $t_1$ and $t_3$)

After a time delay of $t_o$ plus $t_{HL}$, corresponding to time $t_3$, the termination of the acoustic wave initiated at time t1 reaches the laser beam causing the laser to switch to a low loss state as in FIG. 1B. Consequently the laser begins to oscillate and create a pulse of light. At time "$t_4$", the acoustic wave initiated at time $t_2$ reaches the laser beam in the cell and again causes a high loss state within the laser because light is being diffracted out of the resonator path. This results in the tail of the q-switched laser pulse, which would normally end at time "$t_5$", to be is curtailed at time "$t_4$". The cut-off time of the laser's pulse tail is controlled by the duration of "$t_{LL}$", i.e., the time duration the AO cell is turned off.

Experimental Results:

Several oscilloscope traces illustrating typical Q-switched operation are shown in FIGS. 4 and 5 for a 9 fold waveguide $CO_2$ laser. In each of the two Figures, the upper trace (FIGS. 4A and 5A) is the modulator RF drive signal at approximately 40 MHz. The 40 MHz signal was captured by using an in-line directional coupler. The lower trace in each Figure (FIGS. 4B and 5B) is the Q-switched laser pulse. The sweep speed of FIG. 4 is 400 nanoseconds per major division and for FIG. 5 it is 10 microseconds per major division. The RF power to the AO cell was maintained at 30 W to maintain a high loss state to allow the laser to achieve a large over population of the upper laser level. The RF drive to the cell was then gated off for approximately an 800 nsec interval. Note that the Q-switched laser pulse occurred approximately 2,250 nanoseconds later. A large part of this delay is due to the finite transit time for the acoustic wave in the Ge crystal to reach the intra-cavity laser beam and the transit time it takes the acoustic waves to propagate across the diameter of the laser beam. The acoustic velocity in Ge is 5500 m/s, while the beam diameter of the laser used in the experiment was approximately 2 mm across. There is also a delay caused by the RF driver fall and rise time and the optical build-up time for the laser.

FIG. 4B shows that the resulting Q-switched laser pulse has a width on the order of 110 ns FWHM, which is comparable to that obtained with traditional electro-optic Q-switching. However, the tail of the pulse tends to roll off for a considerable longer time, rather than being quickly cut off as in EO Q-switching. This is again due to the finite acoustic transit time in the Ge crystal. It should be also noted that this relatively long transit time makes the use of acousto-optic cells in simultaneously laser Q-switching and cavity-dumping operation unattractive because the resulting optical pulse duration will be on the order of 100 ns, as opposed to less than 20 ns for the EO cavity dumped version. FIG. 5 illustrates Q-switched operation at a 50 kHz PRF.

Figure 6:
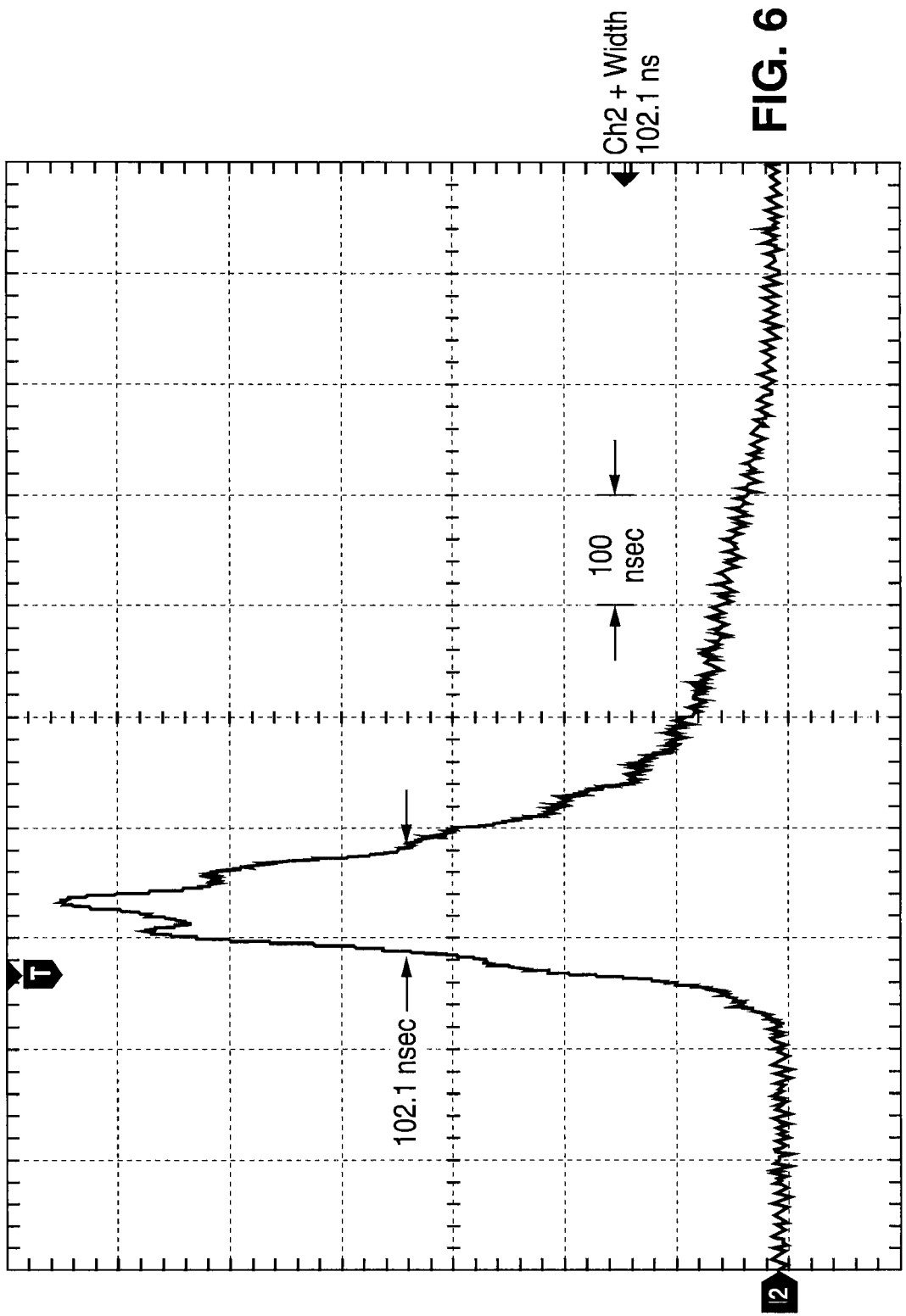

The oscilloscope trace of FIG. 6 shows a Q-switched pulse at a faster sweep speed, i.e., at 100 nsec per major division.

As can be seen, from FIGS. 4 to 6, a broad range of pulse formats can be commanded with AO cells. This includes pulse bursts synchronized with pulsed RF driving the laser discharge, coupled with external pulse triggering from a user interface so as to provides AO Q-switching the same flexibility as with the EO Q-switching.

Figure 7:
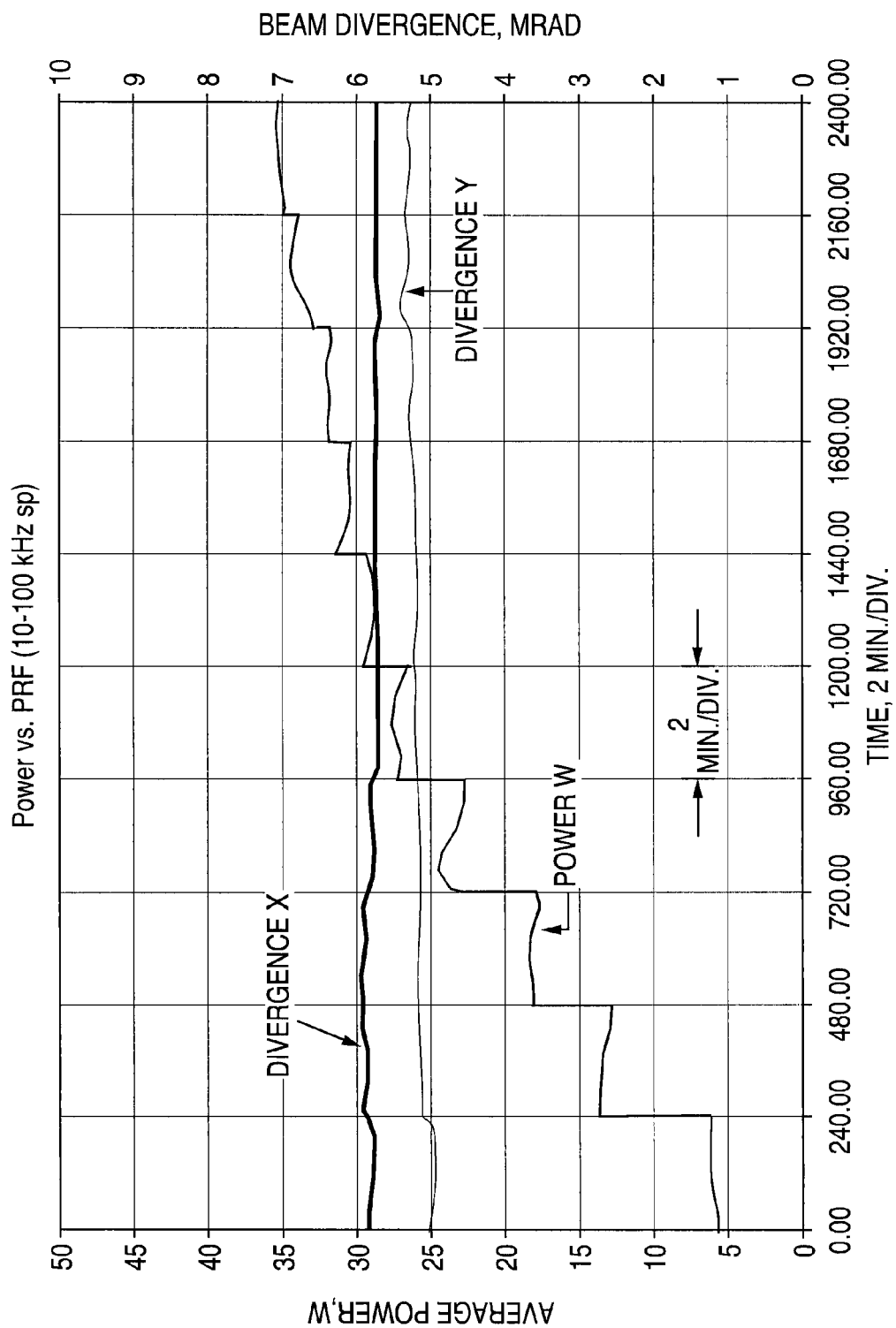
FIG. 7 is a plot of average output power and beam divergence as a function of pulse repetition frequency (PRF) of a carbon dioxide laser of the type illustrated in FIG. 2.

A plot of average output power with PRF from 10 kHz to 100 kHz and its corresponding two dimensional (x and y axes) far-field beam divergence are provided in FIG. 7. This data was taken with the AO modulator's pulse repetition frequency being increased from 10-100 kHz, in 10 kHz steps every 2 minutes. A maximum power of over 30 W was obtained at the maximum rate, with the RF off time for each pulse being kept constant at 800 nsec throughout the test run. As can be seen, the beam divergences in both axes remained essentially constant over the entire operating range. This indicates that thermal lensing in the Ge AO crystal is not sufficiently serious as to significantly degrade overall resonator stability, at least at these power levels.

Figure 8:
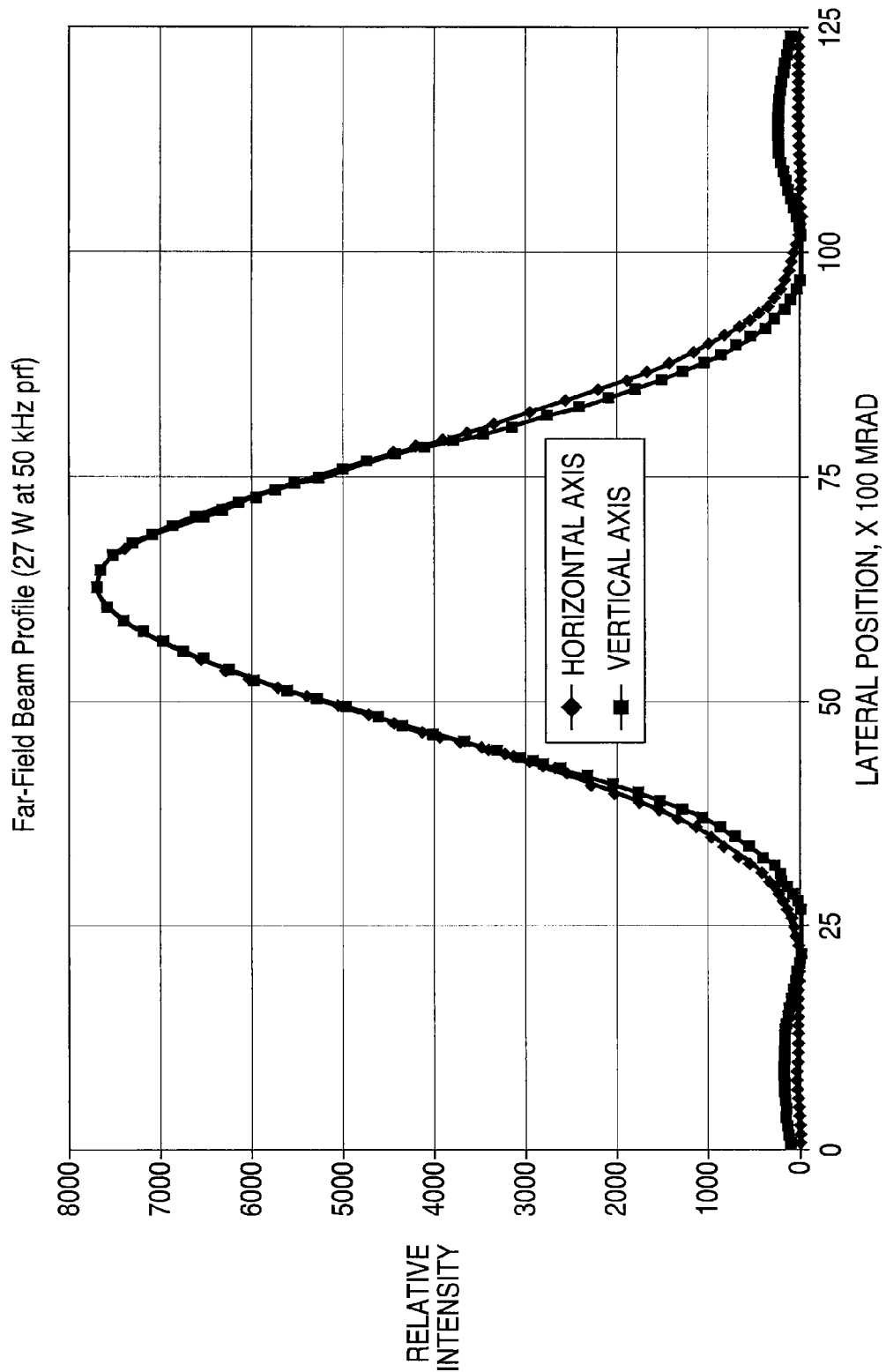
FIG. 8 is a plot of the far field profile of a beam generated by a carbon dioxide laser of the type illustrated in FIG. 2.

The far-field output beam profile in the x and y axes at 50 kHz PRF and 27 W output power is shown in FIG. 8. FIG. 8 shows that the beam is near-Gaussian in both axes.

Common Power Supply

In the FIG. 2 embodiment discussed above, two power supplies are shown. More specifically, power supply 22 provides the high power input for the electrodes while power supply 30 provides a lower power input for the AO cell. In the example discussed above, power supply 22 operated at a frequency of 100 MhZ and power supply 30 operated at 40 MHz. Since both supplies generate RF power, it would be possible to operate the laser with a single power supply at a single frequency. This approach can simplify the laser and significantly reduce costs. Using one power supply will somewhat reduce the freedom to vary the shape of the pulses.

Figure 9:
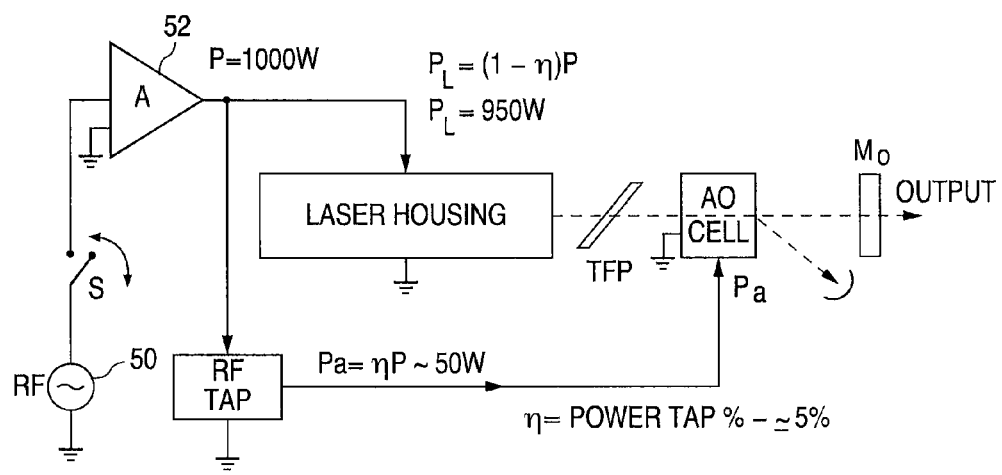
FIG. 9 is a schematic diagram of a laser system wherein a single power source is used to supply RF energy to both the laser and the AO cell.

FIG. 9 schematically illustrates the basic physical arrangement for a laser system wherein only power supply is used to excite the discharge and activate the Q-switch utilizing the invention. The output from the power supply 50 is passed through a single switch "S". The RF signal out of switch S is passed through a chain of transistor power amplifiers 52 to obtain the power desired to be delivered to the laser's discharge. The output power from the amplifier P is typically about 1 kW. A small percentage, "η", say several percent of the output of P, is tapped off by an RF tap so that the power feed to the AO cell is: $Pa=\eta P$ where η is the percentage of the P power tapped off. This leaves the power (PL) provided to the laser discharge as $PL=(1-\eta) P_A$. Some typical numbers are "P"=1 kW, $P_a=\eta(P)=50$ W for the AO cell. At 100 MHz, the AO cell can be, for example, the IntraAction Corp. AO cell model AGM-1005A21-51 operating at 100 MHz. With η=0.05, yields $P_L$=950 W for the laser discharge driven at 100 MHz.

The approximate −13 dB RF tap for the AO cell can be obtained by various well known techniques in the RF art, such as a RF directional coupler fabricated by either transmission lines or printed circuit board technologies, or a tapped autotransformer, or by a tapped capacitive bridge or by an inductor/capacitor networks, etc.

Figure 10:
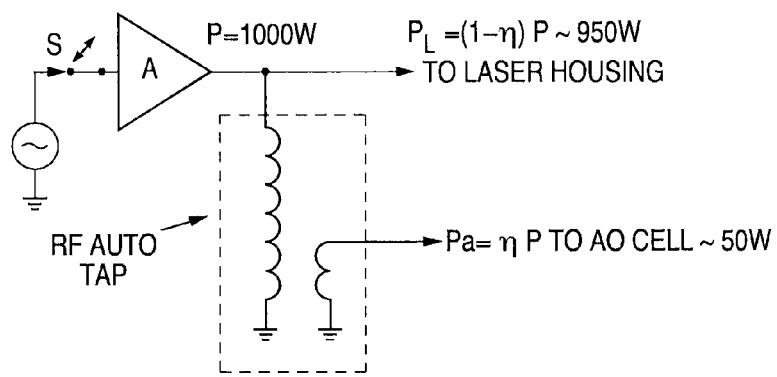
FIG. 10 is an illustration of one form of an RF tap which can be used to divert some of the energy generated by the RF power source to the AO cell.

As an example, FIG. 10 illustrates a −13 dB auto-transformer RF tap approach for coupling a small amount of power from the output of a 1 kW RF power supply to drive an AO cell requiring 50 W of power. Either a fixed turn tap (not shown) or a mutual inductive coil tap (as shown in FIG. 10) can be used to couple out the small RF power required to drive the AO cell. Such an auto-transformer RF tap technique is well known in the RF art.

Referring back to FIG. 9, closing the switch S delivers RF power to both the $CO_2$ laser and the AO cell. Since the AO cell is then turned on, it prevents laser oscillation, thereby causing the overpopulation of the upper laser level to builds up. When the overpopulation in the laser's upper level is maximized, S is opened, thereby turning off the laser and the AO cell at the same time. When S is opened, the laser discharge is turned off but its optical resonator is in a low loss state because the AO cell is also turned off. Consequently, laser oscillation is initiated as soon as the time delay associated with the acoustic waves propagating from the acoustic transducer pass the location where the laser beam propagates through the AO cell. The acoustic velocity in Ge is approximately $5.5 \times 10^5$ cm/sec so it takes approximately 1.8 microseconds for the acoustic waves to travel 1 cm.

FIG. 11 presents a time sequence view of events for the invention. At time $t_o$, the switch S of FIG. 9 is closed thereby providing RF power "P" out of the RF power supply (i.e. assumed to be 1 kW) as depicted in FIG. 11A. Since "$\eta$" percentage of P is tapped off for the AO cell, the RF power provided to the laser discharge is $P_L=(1-\eta)$ P and the power provided to the AO cell is $P_a=\eta P$ (see FIG. 11B). Assume $\eta=0.05$, so that for 1 kW out of the RFPS yields $P_L=950$ W and $P_a=50$ W, for this example. The time duration of the RF pulse is denoted as $T_{bu}$ in FIG. 11A. The amplitude of this pulse can be twice the average power of the RF supply's because of the lowered duty cycle (superpulse operation discussed above).

Since the laser beam propagating through the AO cell is some distance away from the acoustic transducer, there will be a time delay ($T_D$) before the acoustic waves intercept the laser beam to transition the optical resonator to a high loss state at time $t_1$ (see FIG. 11C). At time $t_1$, the population of the laser's upper state begins to build up and reaches a maximum at time $t_2$ after which it levels off (see FIG. 11D). At time $t_3$ the RF power to the laser discharge and the AO cell is cut off by closing switch S. The pulsed acoustic waves propagating within the AO cell continue to pass through the laser beam for a period equal to $T_D$ and until time $t_4$. Since the RF power to the laser discharge is stopped at time $t_3$, the population of the upper laser level begins to drop off due to amplified spontaneous emission during the time between $t_3$ to $t_4$. At time $t_4$, the Q-switch becomes transmissive and the laser enters the low loss state. At this point, laser oscillation begins to occur and an output builds up and is extracted as a pulse. The peak of the Q-switched pulse occurs at time $t_5$ as shown in FIG. 11E. Since the time difference between $t_3$ and $t_4$ is less than several microseconds while the lifetime of the laser's upper state is many tens of microseconds, the energy loss between $t_3$ and $t_4$ is minor.

The residual radiation contained in the tail of the Q-switched pulse terminates naturally in this example between times $t_6$ and $t_7$. In this example, switch S is closed at time $t_6$ but the Q-switch remains in the transmissive state until time $t_8$ due to the time delay TD discussed above. Therefore, in this example, there is no tail clipping. As discussed below, if the interval between the time the RF power is turned off (t3) and then turned back on (t6) is reduced, the AO cell will switch to the high loss state before the end of the pulse tail, so that the tail can be chopped. Chopping the tail of a pulse can improve performance, particularly for drilling.

FIG. 12 corresponds to providing experimental data illustrating the actual time sequences after applying RF power simultaneously to the laser's RF discharge and to the AO cell. The laser system used was similar to that used to generate the traces in FIGS. 4 and 5 but modified to use a single power supply for both the discharge and the AO cell. The upper trace (FIG. 12A) is the RF power and lower trace (FIG. 12B) is the laser pulse.

For the experimental example of FIG. 12, the RF power is on for $T_{bu}=12.8$ microsecond, the PRF is ¹⁄₂₀ microseconds or 50 kHz, and the time duration that the RF power is turned off is $T_0=7.2$ microsecond approximately. FIG. 12B illustrates the Q-switched laser pulses that occur at the 50 kHz PRF of the RF pulses from the RFPS. The time delay for the appearance of the Q-switched pulses, after the RF pulses are turned off is approximately 3.2 microseconds. This delay is the sum of the acoustic propagation time TD plus the time ($T_L$) required for the Q-switch pulse to build up out of the spontaneous emission noise within the laser's optical cavity as shown in FIG. 11. Note that in FIG. 12B, the long tail of the Q-switch pulse is cut off 2.4 microseconds after the second RF pulse is turned on. The time delay ($T_D$) is the time required for the acoustic wave to intersect the laser beam in the AO cell.

FIG. 13 illustrates data of the time sequence that occurs when $T_{BU}$ is increased to approximately 18.4 microseconds, thereby decreasing $T_o$ to approximately 1.6 microseconds for the same PRF=50 kHz shown in FIG. 12. Since the RF off time, $T_o$, is shorter in this example than in FIG. 12, the second RF pulses occurs sooner with respect to the pulse tail thereby "chopping off" the radiation in the tail sooner than shown in FIG. 12. By varying the PRF and the duration of the RF pulses provided to both the laser discharge and the AO cell, the PRF and the duration of the radiation in the tail in this single RFPS/single switch, AO Q-switched laser system can be varied to suit the application.

While the subject invention has been described with reference to the preferred embodiments, various changes and modifications could be made therein, by one skilled in the art, without varying from the scope and spirit of the subject invention as defined by the appended claims.

What is claimed is:

1. A $CO_2$ laser comprising:
a housing containing a gaseous gain medium including $CO_2$;
a pair of spaced apart electrodes for exciting the gaseous gain medium to generate a laser beam;
a plurality of waveguide channels located between the electrodes;
a laser resonator including a high reflector and an output coupler and at least one fold mirror, said output coupler providing at least 50 percent output coupling;
a pulsed RF power supply connected to the electrodes for exciting the gain-medium; and
an acousto-optic (AO) cell located in said laser resonator and including an AO material substantially transparent at a fundamental wavelength characteristic of $CO_2$ and wherein the cell is used to switch the resonator between a high and low loss state to generate Q-switched pulses.

2. The laser of claim 1, wherein said AO material is germanium.

3. The laser of claim 1, further including a ceramic material positioned between the electrodes, said ceramic material forming at least two of the walls of the waveguide channels.

4. The laser of claim 3, wherein said ceramic material includes U-shaped slots defining the waveguide channels.

5. The laser of claim 1, wherein the output coupler provides at least 75 percent output coupling.

6. A $CO_2$ waveguide laser comprising:
a housing containing a gaseous gain medium including $CO_2$;
a pair of spaced apart electrodes for exciting the gain medium;
a laser resonator including a high reflector and an output coupler, said output coupler providing at least 50 percent output coupling, said resonator further including at least two fold mirrors to create a folded resonator geometry having at least five passes through the gain medium;
an RF power source supplying energy to the electrodes; and
an acousto-optic (AO) cell located in said laser resonator and including an AO material substantially transparent at a fundamental wavelength characteristic of $CO_2$ and wherein the cell is used to switch the resonator between a high and a low loss state to generate Q-switched pulses.

7. A $CO_2$ laser as recited in claim 6, wherein said AO material is germanium.

8. The laser of claim 6, wherein the power supply generates pulses of RF energy.

9. The laser of claim 6, wherein the output coupler provides at least 75 percent output coupling.

10. A carbon dioxide waveguide laser comprising:
    a housing containing carbon dioxide gas;
    a pair of spaced apart electrodes for exciting the laser gas to generate a laser beam;
    a ceramic material positioned between the electrodes and defining the side walls of at least five waveguide channels;
    a laser resonator including a high reflector and an output coupler and a plurality of fold mirrors for directing laser beam along the waveguide channels and wherein the output coupler provides at least 50 percent output coupling; and
    an acousto-optic (AO) cell located in said laser resonator and including an AO material substantially transparent at a fundamental wavelength characteristic of $CO_2$ and wherein the cell is used to switch the resonator between a high and low loss state to generate Q-switched pulses.

11. The laser of claim 10, wherein said AO material is germanium.

12. The laser of claim 10, further including a pulsed RF power supply connected to the electrodes for supplying energy to the electrodes.

13. The laser of claim 10, wherein the output coupler provides at least 75 percent output coupling.

14. The laser of claim 1, wherein the resonator is configured to cause the laser to generate a fundamental wavelength of 9.25 microns.

15. The laser of claim 6, wherein the resonator is configured to cause the laser to generate a fundamental wavelength of 9.25 microns.

16. The laser of claim 10, wherein the resonator is configured to cause the laser to generate a fundamental wavelength of 9.25 microns.

* * * * *